US009303321B2

(12) United States Patent
Cavanaugh et al.

(10) Patent No.: US 9,303,321 B2
(45) Date of Patent: Apr. 5, 2016

(54) CLADDING COMPOSITION WITH FLUX PARTICLES

(71) Applicant: Caterpillar Inc., Peoria, IL (US)

(72) Inventors: Daniel Thomas Cavanaugh, Chillicothe, IL (US); Daniel Joseph Sordelet, Peoria, IL (US); Justin Curtis Embrey, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 13/848,310

(22) Filed: Mar. 21, 2013

(65) Prior Publication Data

US 2014/0287165 A1   Sep. 25, 2014

(51) Int. Cl.
*C23C 26/02* (2006.01)
*C23C 24/10* (2006.01)
*B23K 26/14* (2014.01)

(52) U.S. Cl.
CPC .............. *C23C 24/103* (2013.01); *B23K 26/14* (2013.01); *B23K 26/144* (2015.10); *B23K 26/1476* (2013.01); *B23K 26/342* (2015.10); *C23C 26/02* (2013.01); *B23K 2203/04* (2013.01); *B23K 2203/10* (2013.01); *B23K 2203/12* (2013.01)

(58) Field of Classification Search
None
See application file for complete search history.

(56) References Cited

U.S. PATENT DOCUMENTS

| 3,971,501 | A | * | 7/1976 | Cooke .......................... 228/248.1 |
| 4,619,716 | A | * | 10/1986 | Suzuki et al. .................... 148/26 |
| 7,670,406 | B2 | | 3/2010 | Belashchenko |
| 7,850,795 | B2 | | 12/2010 | Kawasaki et al. |
| 2006/0090593 | A1 | * | 5/2006 | Liu .................................. 75/252 |
| 2011/0089151 | A1 | | 4/2011 | Miyagi et al. |
| 2011/0247188 | A1 | * | 10/2011 | Van Rooyen et al. ...... 29/402.01 |

FOREIGN PATENT DOCUMENTS

| CN | 102363853 | 2/2012 |
| JP | 2007/064009 | 3/2007 |
| KR | 20030045262 | 6/2003 |

OTHER PUBLICATIONS

Yang et al., "TiC reinforced composite coating produced by powder feeding laser cladding," 2004, Materials Letters, vol. 58, pp. 2958-2962.*

Yang, S., "Fabrication of Nickel Composite Coatings Reinforced with TiC Particles by Laser Cladding," Surface and Coatings Technology, vol. 183, 2004, pp. 254-260.

* cited by examiner

*Primary Examiner* — Shamim Ahmed
*Assistant Examiner* — Bradford Gates
(74) *Attorney, Agent, or Firm* — Finnegan, Henderson, Farabow, Garrett & Dunner, LLP

(57) ABSTRACT

The present disclosure is related to a cladding composition. The cladding composition may include cladding powder particles and flux particles. The flux particles may have an average particle size of less than about 40 μm, and more than about 50% of the flux particles may adhere to the surfaces of the cladding powder particles.

11 Claims, 3 Drawing Sheets ent disclosure relates generally to a cladding composition and, more particularly, to a cladding composition having flux particles.

BACKGROUND

Laser cladding can be used to form coating surfaces on substrates. The coating surfaces are formed by melting a cladding powder, often containing metals, with a laser in a cladding apparatus. The melted cladding powder forms a molten pool on the surface of the substrate, which cools to form the coating surface.

When the cladding powder melts, the molten pool forms from aggregated melted cladding powder particles. The individual particles of the cladding powder, however, often have oxides formed on the surfaces of the particles. When the particles melt in the laser cladding process, the heated oxides are converted into gases. The gases generated from the melted particles can get trapped in the molten pool as the incited particles aggregate, and when the molten pool cools, the trapped gases form pores in the coating surface. These pores can distort the surface texture of the coating surface.

Attempts to prevent formation of pores in the coating surface include dry mixing the cladding powder with a flux. The flux reacts with the gases formed by heating the oxides on the surfaces of cladding powder particles, and thereby prevents the gases from being trapped in the coating surface.

The flux, however, can be difficult to distribute throughout the cladding powder and results in a mixture with a diminished flow mobility because the flux particles stick together. Reduced flow mobility can clog the tubes of the laser cladding apparatus that feed the cladding powder and flux mixture to a cladding head.

The cladding composition of the present disclosure solves one or more of the problems set forth above and/or other problems in the art.

SUMMARY

In one aspect, the present disclosure is related to a cladding composition. The cladding composition may include cladding powder particles and flux particles. The flux particles may have an average particle size of less than about 40 μm, and more than about 50 percent of the flux particles may be adhered to surfaces of the cladding powder particles.

In another aspect, the present disclosure is related to a method of making a cladding composition. The method may include mixing cladding powder particles, flux particles, and a liquid to form a slurry. The process may also include drying the slurry to remove the liquid from the slurry. After the slurry is dried, the flux particles may have an average particle size of less than about 40 μm, and more than about 50 percent of the flux particles may be adhered to surfaces of the cladding powder particles.

DETAILED DESCRIPTION

Figure 1:
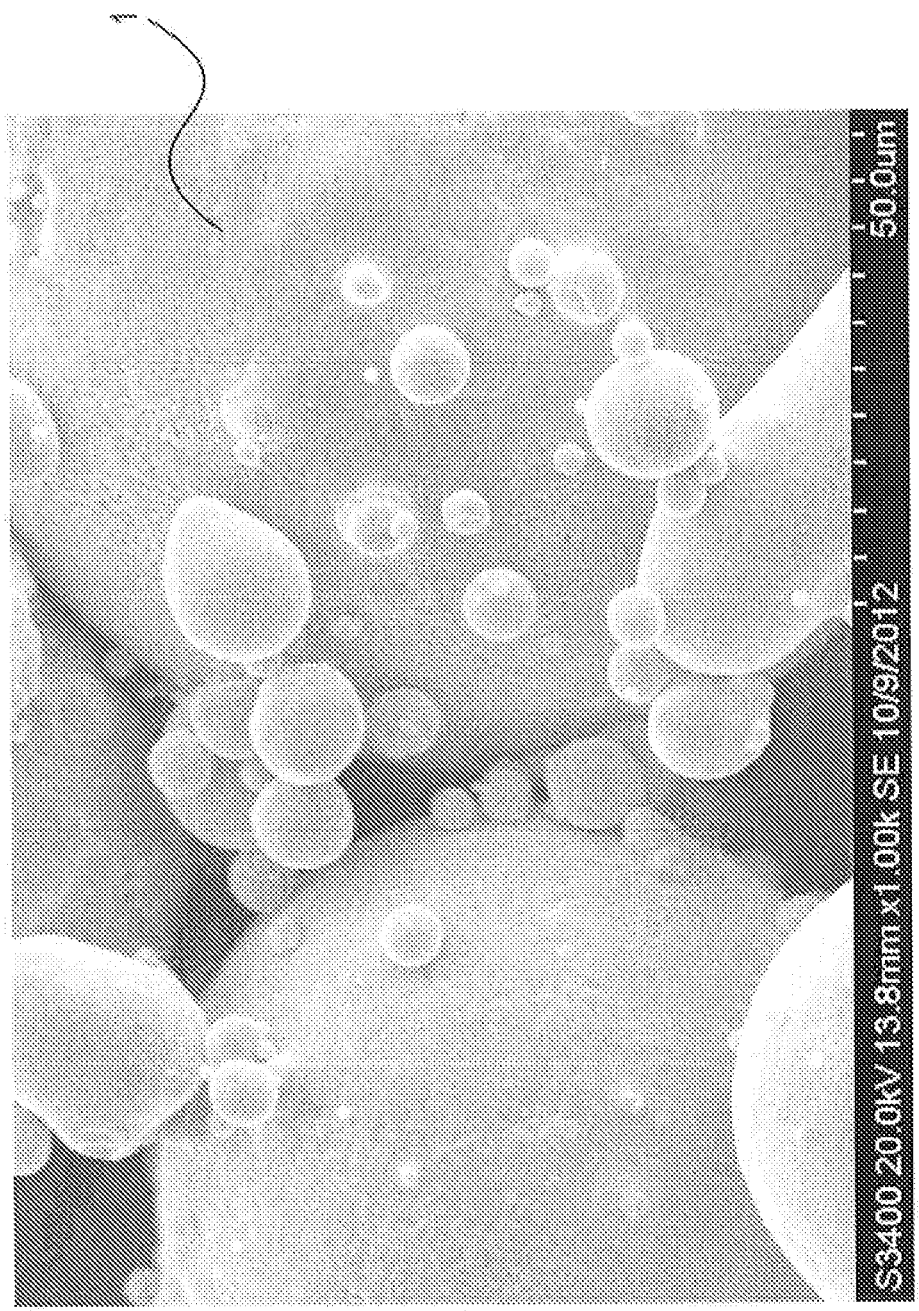
FIG. 1 is a Scanning Electron Microscope (SEM) image of exemplary disclosed cladding particles without flux.

FIG. 1 shows exemplary cladding powder particles 1 according to the present disclosure. The cladding powder particles 1 shown in FIG. 1 may be made of metal and may be manufactured by atomization, which subjects molten metal flowing through a nozzle to a high velocity fluid flow. During the atomization process, molten metal droplets solidify to form cladding powder particles 1. Atomization may produce cladding powder particles 1 that are generally spherical in shape. Cladding powder particles 1 may be further subjected to various sieve steps to obtain a suitable particle size. In one embodiment, cladding powder particles 1 may have an average particle size of about 20 μm to 200 μm. In another embodiment, cladding powder particles 1 may have an average particle size of about 50 μm to 150 μm.

Cladding powder particles 1 may be formed from any metal. For example, cladding powder particles 1 may include at least one of a tool steel, a nickel based alloy, a cobalt based alloy, a silver based alloy, a copper based alloy, aluminum, and a carbide in a metal matrix. In one embodiment, cladding powder particles 1 may include tool steel having iron and a weight percent composition of about 1.6% carbon, about 0.3% manganese, about 4.0% chromium, about 5.0% cobalt, about 4.9% vanadium, about 12.00% tungsten, about 0.30% silicon, and about 0.06% sulfur. In another embodiment, cladding powder particles 1 may include a nickel based alloy with a weight composition of about 0 to 30% chromium, 0 to 3% manganese, 0 to 30% molybdenum, 0 to 40% copper, 0 to 40% iron, and a balance of nickel. In a further embodiment, cladding powder particles 1 may include at least one of tungsten carbide, titanium carbide, zirconium carbide, hafnium carbide, or titanium diboride in a nickel or tool steel matrix.

Figure 2:
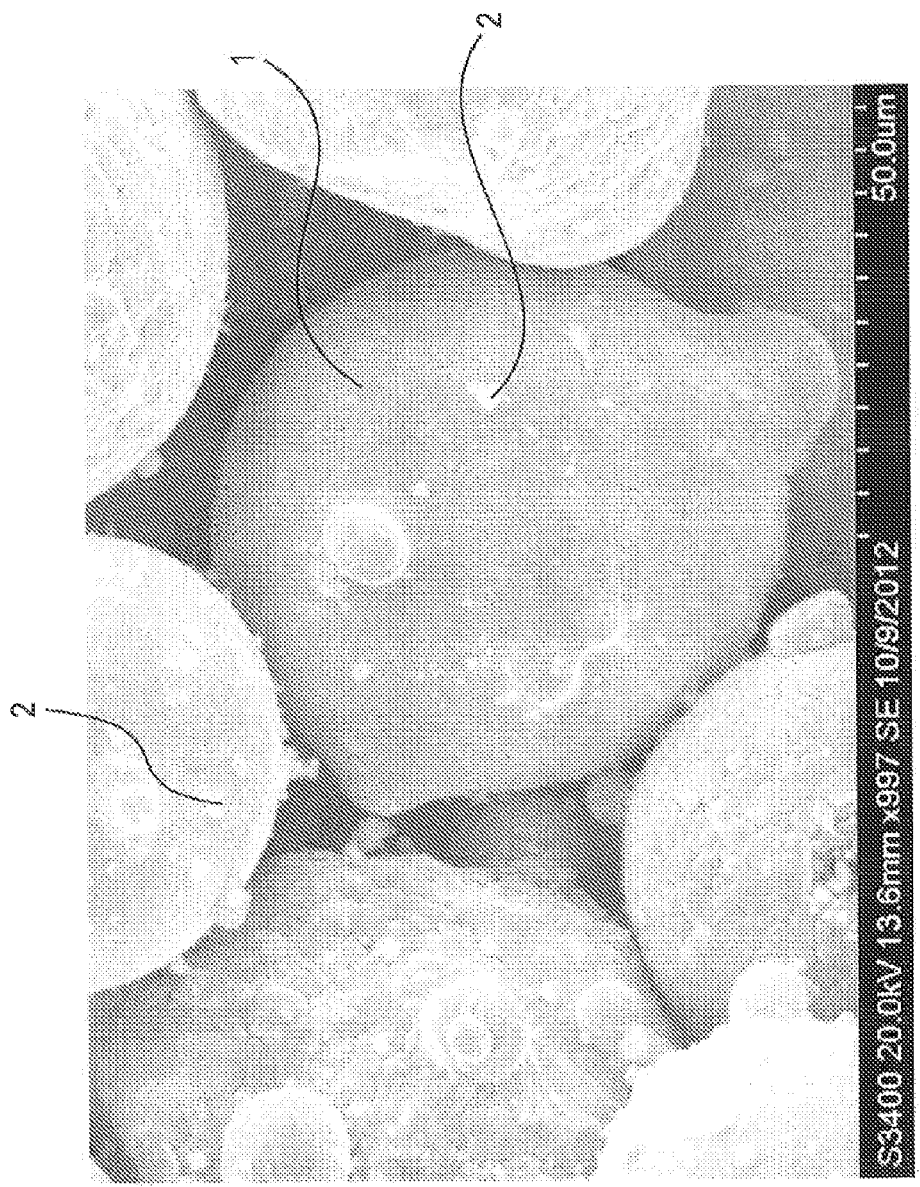
FIG. 2 is a SEM image of an exemplary disclosed cladding composition with flux particles adhered to the surfaces of the cladding powder particles.

For the purposes of this disclosure a cladding composition 14 (FIG. 3) includes a combination of cladding powder particles 1 and flux particles 2. FIG. 2 shows an exemplary cladding composition 14 with flux particles 2 adhered to the surfaces of cladding powder particles 1. Flux particles 2 appear as white flake-like particles on the surfaces of cladding powder particles 1. In one embodiment, flux particles 2 may have an average particle size of less than about 40 μm. In another embodiment, flux particles 2 may have an average particle size of less than about 20 μm.

Cladding composition 14 may include flux particles 2 that adhere to the surfaces of the cladding powder particles 1 and flux particles 2 that are not adhered to the surfaces of cladding powder particles 1. In one embodiment, more than about 50 percent of flux particles 2 in cladding composition 14 adhere to the surfaces of cladding powder particles 1. In another embodiment, about 50% to 95% of flux particles 2 in cladding composition 14 adhere to the surfaces of cladding powder particles 1. In a further embodiment, more than 95% of flux particles 2 in cladding composition 14 adhere to the surfaces of cladding powder particles 1.

Flux particles 2 may comprise at least one salt having an alkaline metal or alkaline earth metal cation and a halogen anion. In one embodiment, the cation of the at least one salt may be selected from calcium, magnesium, or sodium and the anion selected from fluorine, chlorine, or bromine. In another embodiment, flux particles 2 may include $CaF_2$.

Cladding powder particles 1 may make up a majority of the weight of cladding composition 14. In one embodiment, cladding powder particles 1 may make up about 95-99% of the total weight of cladding composition 14 and flux particles 2 may make up about 1-5% of the total weight of cladding composition 14.

Figure 3:
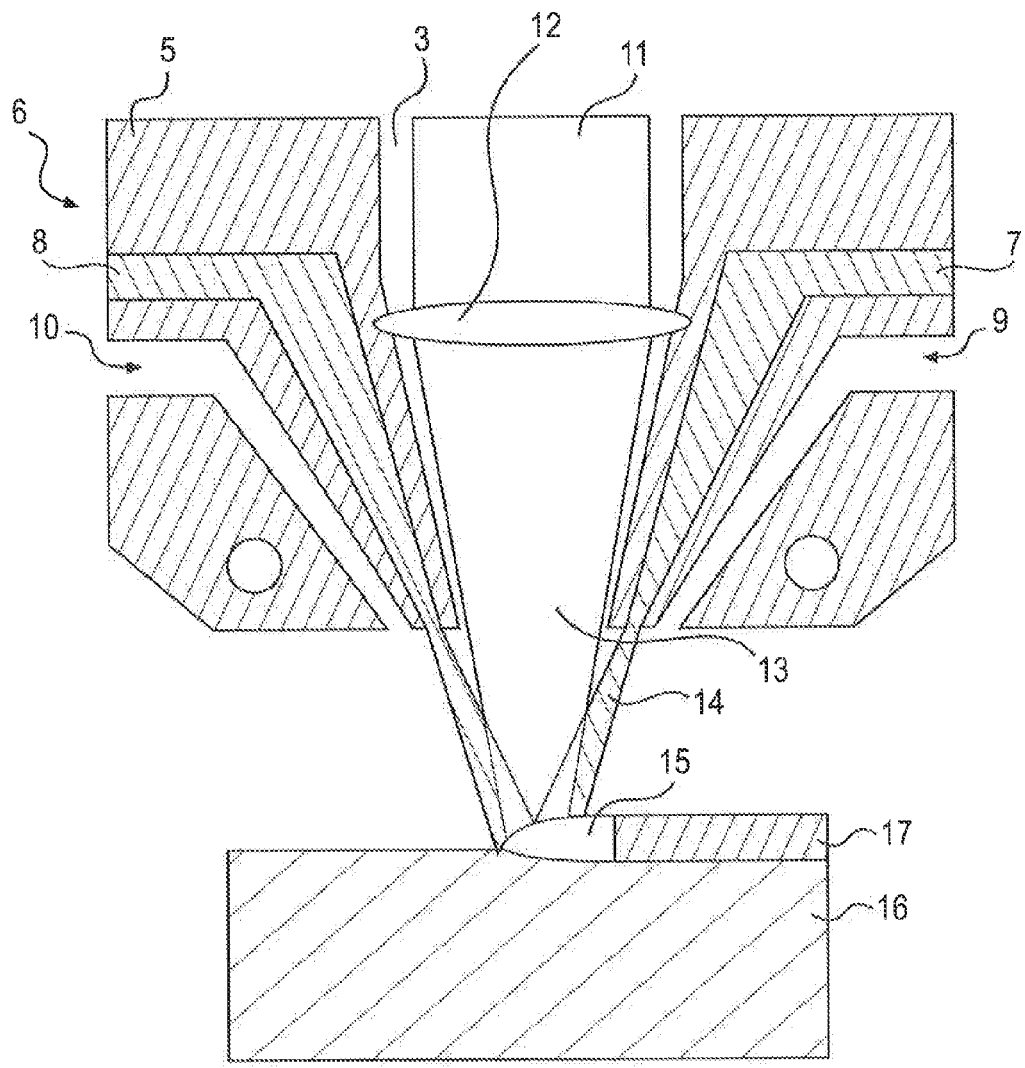
FIG. 3 is a pictorial illustration of an exemplary disclosed laser cladding system that may be used to apply cladding compositions to substrates.

FIG. 3 shows generally an exemplary laser cladding apparatus that may be used to apply a cladding composition 14 to a substrate 16. The laser cladding apparatus may include a cladding head 6. Cladding head 6 may be adapted to deliver a laser beam 11 through a chamber 3 defined inside cladding head 6. A nozzle 5 may deliver cladding composition 14 through powder feed tubes 7 and 8. Carrier gas may be delivered through carrier gas tubes 9 and 10. Laser beam 11 may be focused by a lens 12. Laser beam 13, having been focused, may contact cladding composition 14 and form melt material 15 on substrate 16. According to the orientation of cladding head 6 in FIG. 3, solid track 17 may be formed from solidified melt material 15 as cladding head 6 passes from right to left over substrate 16. A coating surface may be formed from multiple adjacent solid tracks 17, by passing cladding head 6 over substrate 16 multiple times.

Cladding composition 14 may have an increased flow mobility when passed through a single powder feed tube 7 or 8. In one embodiment, cladding composition 14 may have a flow mobility of greater than about 20 g/min when passed through a single powder feed tube 7 or 8 with an internal diameter of about 4 mm. In another embodiment, cladding composition 14 may have a flow mobility of greater than about 30 g/min when passed through a single powder feed tube 7 or 8 with an internal diameter of about 4 mm. In yet another embodiment, cladding composition 14 may have a flow mobility of greater than about 40 g/min when passed through a single powder feed tube 7 or 8 with an internal diameter of about 4 mm.

INDUSTRIAL APPLICABILITY

The disclosed cladding composition may have use in any cladding application. The chemical and physical properties of the disclosed cladding composition embodiments may provide a number of benefits, including improved flow properties of cladding powder and flux mixtures. A process of manufacturing the cladding composition will now be discussed in detail.

The process of making cladding composition 14 may include mixing cladding powder particles 1, flux particles 2, and a liquid to form a slurry. Mixing may include immersing all of cladding powder particles 1 and flux particles 2 in the liquid and mixing cladding powder particles 1, flux particles 2, and the liquid in a mixing apparatus. In one embodiment, mixing of cladding powder particles 1, flux particles 2, and the liquid may be performed in a rolling mill. The mixing of cladding powder particles 1, flux particles 2, and the liquid may be performed for a duration sufficient to achieve uniform distribution of cladding powder particles 1, and flux particles 2 in the liquid. In one embodiment, mixing of cladding powder particles 1, flux particles 2, and the liquid may be performed for about 30 minutes.

The process may further include drying the slurry to remove the liquid from the slurry. During drying, surface tensions created form the liquid evaporating out of the slurry facilitate adherence of the flux particles to the cladding powder particles. Drying may be performed at a temperature sufficient to evaporate the liquid from the slurry, but low enough to avoid formation of oxides on the surfaces of cladding powder particles 1. In one embodiment, drying of the slurry may be performed at a temperature less than about 100° C. until most (if not all) of the liquid evaporates. The drying process is performed to drive substantially all of the liquid from the slurry. The remaining cladding powder particles 1 and flux particles 2 after drying may form a cladding composition 14.

Once dried, cladding composition 14 may be classified to remove both agglomerations and fine flux particles that have not adhered to cladding powder particles 1. Classifying may be performed in a sieving machine that vibrates screens at a frequency to facilitate movement of material through the screens. In one embodiment, the screens may include a first screen with a mesh size of about 200 µm positioned above a second screen with a mesh size of about 20 µm. In another embodiment, the screens may include a first screen with a mesh size of about 150 µm positioned above a second screen with a mesh size of about 45 µm.

The liquid may be any fluid that disperses cladding powder particles 1 and flux particles 2, and evaporates well during the drying step. In one embodiment, the liquid may be water. In another embodiment, the liquid may be an organic solvent. In a further embodiment, the liquid may be an organic solvent with a boiling point of less than about 100° C. In an even further embodiment, the liquid carrying agent may be one of methanol, acetone, ethanol, or isopropyl alcohol. Methanol, for example, is known to have quick drying time.

The presently described manufacturing process may be performed to form a cladding composition that inhibits formation of pores created by trapped gases in the coating surface, while maintaining acceptable flow properties, it will be apparent to those skilled in the art that various modifications and variations can be made to the cladding composition without departing from the scope of the disclosure. Other embodiments of the cladding composition will be apparent to those skilled in the art from consideration of the specification and practice of the cladding composition herein. It is intended that the specification and examples be considered as exemplary only, with a true scope of the disclosure being indicated by the following claims and their equivalents.

What is claimed is:

1. A method of making a cladding composition, comprising:
   mixing cladding powder particles, flux particles, and an organic solvent to form a slurry, wherein the cladding powder particles are fabricated from at least one of a tool steel, a nickel based alloy, a cobalt based alloy, a copper based alloy, or a carbide in a metal matrix; and
   drying the slurry to remove the organic solvent from the slurry,
   wherein after the slurry is dried:
      the flux particles have an average particle size of less than about 40 µm; and
      more than about 50% of the flux particles adhere to surfaces of the cladding powder particles.

2. The method of claim 1, wherein the organic solvent has a boiling point of less than about 100° C.

3. The method of claim 2, wherein the organic solvent is selected from the group consisting of methanol, acetone, ethanol, and isopropyl alcohol.

4. The method of claim 3, wherein the organic solvent is methanol.

5. The cladding composition of claim 1, wherein mixing includes immersing the cladding powder particles and the flux particles in the organic solvent.

6. The method of claim 1, wherein the cladding powder particles have an average particle size of about 20 µm to 200 µm.

7. The method of claim 1, wherein the flux particles include at least one salt, wherein the at least one salt includes an alkaline metal or alkaline earth metal cation and a halogen anion.

8. The method of claim 1, wherein the flux particles make up about 1-5% of a total weight of the cladding composition.

9. The method of claim 1, wherein the cladding composition has a flow mobility of greater than about 20 g/min when passed through a tube with an internal diameter of about 4 mm.

10. The method of claim 1, wherein drying of the slurry is performed at a temperature less than 100° C. until substantially all of the organic solvent evaporates.

11. A method of laser cladding, comprising:
- mixing cladding powder particles, flux particles, and an organic solvent to form a slurry, wherein the cladding powder particles are fabricated from at least one of a tool steel, a nickel based alloy, a cobalt based alloy, a copper based alloy, or a carbide in a metal matrix;
- drying the slurry to remove substantially all of the organic solvent from the slurry, wherein after the slurry is dried:
  - the flux particles have an average particle size of less than about 40 μm; and
  - more than about 50 percent of the flux particles adhere to surfaces of the cladding powder particles; and
  - the cladding powder particles and flux particles form a cladding composition;
- feeding the cladding composition to a laser cladding head at a rate of greater than about 20 g/min;
- melting the cladding composition with a laser; and
- forming a molten pool of the cladding composition on a substrate.

* * * * *